United States Patent Office 3,751,489
Patented Aug. 7, 1973

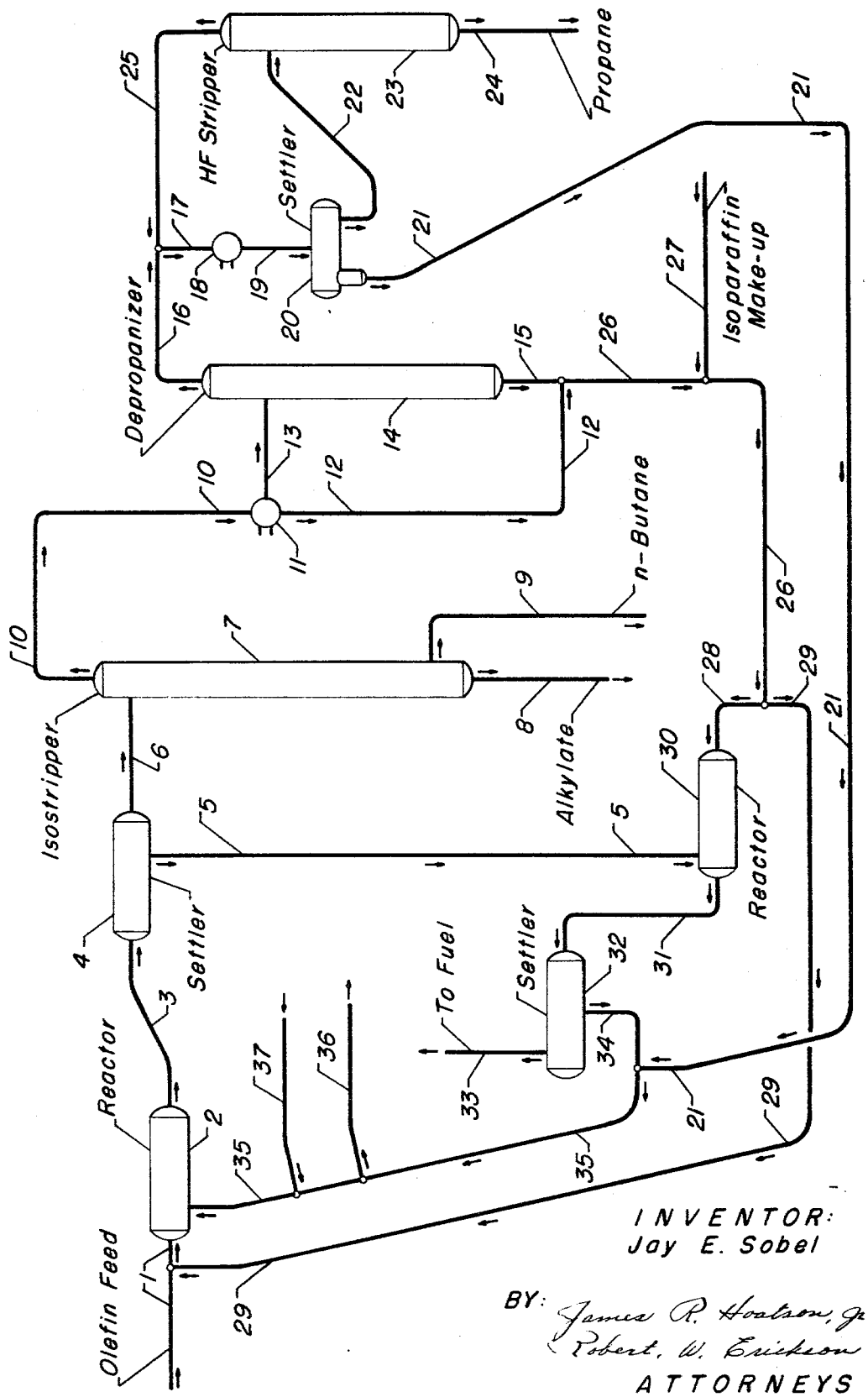

3,751,489
HYDROGEN FLUORIDE PURIFICATION
Jay E. Sobel, Des Plaines, Ill., assignor to Universal Oil Products Company, Des Plaines, Ill.
Filed Apr. 5, 1971, Ser. No. 131,235
Int. Cl. C07c 3/54
U.S. Cl. 260—683.48          11 Claims

ABSTRACT OF THE DISCLOSURE

A process for producing an alkylate product from an isoparaffin and an olefin, utilizing hydrogen fluoride catalyst, in which process the catalyst and reactants are admixed in an alkylation zone, the effluent from the alkylation zone is separated to provide a hydrocarbon stream and a catalyst stream, the alkylate product is recovered in the hydrocarbon stream, the catalyst stream is contacted with a second portion of the isoparaffin in a second alkylation zone, and the effluent from the second alkylation zone is separated to provide a second hydrocarbon stream and a second catalyst stream.

BACKGROUND

This invention relates to a process for producing an alkylate product from an alkylatable reactant and an olefin-acting reactant. More specifically, this invention relates to a process for producing an improved alkylate product by contacting hydrogen fluoride, previously utilized as a catalyst in the process, with a portion of the alkylatable reactant in order to react undesirable hydrocarbons present in the used acid with the alkylatable reactant and remove them from the acid. In one aspect, this invention relates to a method for improving the properties of the hydrocarbon components in solution in hydrogen fluoride catalyst utilized in an alkylation process. In another aspect, this invention relates to a process for producing an alkylate product having better anti-knock properties than is possible in previously known processes. More specifically, this invention relates to a process which comprises contacting an alkylatable reactant with an olefin-acting reactant and with hydrogen fluoride catalyst in an alkylation zone, separating the effluent from the alkylation zone into a hydrocarbon stream and a catalyst stream, recovering the product in the hydrocarbon stream, contacting the catalyst stream with a second portion of the alkylatable reactant in a second alkylation zone, and separating the effluent from the second alkylation zone into a second hydrocarbon stream and second catalyst stream.

Alkylation of isoparaffins with olefins utilizing hydrogen fluoride catalyst is a well-known method for producing hydrocarbon products suitable for use as components of motor fuels. The alkylate product produced in such processes possesses excellent anti-knock properties, and is often used as a blending component to upgrade the octane rating of less valuable hydrocarbon fuels. While the product of prior art alkylation processes has been of adequate quality as a blending component when treated with lead compounds, there is an increasing demand for high octane motor fuel which contains no lead compounds. The demand for lead-free motor fuels has resulted in an increase in the anti-knock properties required in alkylate blending stocks used to upgrade the less valuable fuels. There is a present need for improvements in hydrogen fluoride-catalyzed alkylation processes to provide the required higher quality product. In a typical alkylation process for producing a motor fuel alklate, higher quality alkylate is characterized as having a higher ratio of trimethylpentanes to diethylhexanes than that of a lower quality product. The more highly branched product is preferred over the less branched product because, in general, a more highly branched product possesses a higher octane rating, and a greater ratio of more branched product to less branched product in alkylate is indicative of better anti-knock properties.

It is known in the art that the quality of the product of an alkylation process depends, in part, on the maintenance of process conditions at optimum levels. Among the process variables important in producing a high quality product are the reaction temperature, composition of the reactants, composition of the hydrogen fluoride catalyst employed, etc. It is known that the quality of the product may be enhanced by utilizing, as a catalyst, hydrogen fluoride which has certain hydrocarbons in solution. These solute hydrocarbons have been characterized as organic diluents. Other, very similar hydrocarbons are known as acid-soluble oils. The catalyst-soluble hydrocarbons typically comprise oligomers of the olefin-acting reactant in the process. They have an average molecular weight in the range from about 100 to about 500. Other organic diluents such as polycyclic aromatics have been disclosed, but commercial processes generally rely on catalyst-soluble hydrocarbons produced within the alkylation process itself by the oligomerization of the olefin-acting reactant. In prior art alkylation processes, the acid and the reactants are contacted in an alkylation zone, the effluent from the alkylation zone is allowed to settle into a hydrocarbon phase and a catalyst phase, and the hydrocarbon phase is separated and further processed to recover the alklate product, while the catalyst phase is recycled to the alkylation zone for further use in catalyzing the alkylation reaction. In prior art processes, the hydrocarbons which remain in solution in the recycled acid, when it settles into a separate phase, are utilized, without further processing, as the organic diluent in the catalyst. It is known that at least a part of these acid-soluble hydrocarbons are olefinic or olefin-acting and that their use as constituents of the diluent is detrimental to the production of high quality alkylate product. Prior art processes employed catalyst regeneration means to purify a slip stream of recycle acid diverted from the primary recycle catalyst stream. In the regeneration procedure, catalyst is separated from tars and azeotropic mixtures of water and acid. The tars and acid-water mixtures are withdrawn from the process and the purified acid is returned to the primary recycle catalyst stream. It is to be noted that the portion of recycle catalyst withdrawn from the primary recycle stream is very small with respect to the total acid recycle from the settler to the alkylation zone. Thus, the objectionable olefinic content of the recycle catalyst remains at about the same level with or without the operations of regeneration schemes, and the presence of undesirable olefin-acting components in the catalyst recycle leads to the formation of an inferior alkylate product in the alkylation reaction. The process of this invention provides a solution to the problem of eliminating these undesirable components in recycled hydrogen fluoride catalyst. The product produced in the process of this invention is of higher quality than that produced in processes of prior art, and the problems related to purification and control of soluble hydrocarbons in the acid catalyst utilized in the process are substantially obviated.

SUMMARY

Therefore, an object of this invention is to provide a process for producing an alkylate product from an alkylatable reactant and an olefin-acting reactant utilizing hydrogen fluoride as a catalyst. Another object of this invention is to provide a method for eliminating undesirable hydrocarbon components in a hydrogen fluoride catalyst utilized in an alkylation reaction. Yet another object of this invention is to provide an isoparaffin-olefin alkylation reaction product having superior anti-knock properties.

In an embodiment, therefore, this invention relates to a hydrogen fluoride-catalyzed alkylation process in which a superior reaction product is produced by eliminating undesirable olefinic hydrocarbon components in the hydrogen fluoride catalyst. In another embodiment, this invention relates to an alkylation process in which the catalyst to be recycled to the alkylation zone is first contacted with the isoparaffinic reactant. In a more specific embodiment, this invention relates to a process for producing an alkylate product from an alkylatable reactant and an olefin-acting reactant, utilizing hydrogen fluoride as a catalyst, which comprises the steps of: (a) contacting said reactants and said catalyst in a first alkylation zone at alkylation conditions; (b) separating at least a portion of the effluent from said first alkylation zone into a hydrocarbon stream and a catalyst stream in a first separation zone at separation conditions and recovering said product in said hydrocarbon stream; (c) contacting said catalyst stream with a second portion of said alkylatable reactant in a second alkylation zone at alkylation conditions; and (d) separating the effluent from said second alkylation zone in a second separation zone at separation conditions to recover a second catalyst stream and a second hydrocarbon stream. Further objects and embodiments will become apparent from the following description of the accompanying drawing and detailed description.

DRAWING

The accompanying drawing is intended to illustrate an embodiment of the process of this invention. The particular embodiment illustrated is not intended to limit the scope of this invention nor act as a limitation on other embodiments of the invention. Various modifications and embodiments will be obvious to those skilled in the art from the following description. Various necessary apparatus which is standard to such a process has not been shown, but will be equally obvious to one skilled in the art.

Olefin feed in conduit 1 is combined with recycled and make-up isoparaffin in conduit 29 and charged to alkylation reactor 2. The effluent from reactor 2 is carried by conduit 3 to settler 4 where a hydrocarbon phase and a hydrogen fluoride phase are separated. The hydrocarbon phase is withdrawn from settler 4 through conduit 6 into isostripper 7. In the isostripper, the alkylate product is separated, withdrawn and recovered through conduit 8. N-butane, a side product, is recovered as a side cut from the isostripper through conduit 9. The overhead from isostripper 7, comprising primarily isoparaffin catalyst and lighter hydrocarbons, is withdrawn through conduit 10 and charged to partial condenser 11. In partial condenser 11, a part of the isoparaffin from the isostripper overhead is condensed and withdrawn through conduit 12. The uncondensed portion, comprising mostly lighter hydrocarbons and catalyst, is withdrawn and charged through conduit 13 to depropanizer 14. In depropanizer 14, the remaining isoparaffin is separated from the acid and lighter gases. The isoparaffin is withdrawn in the bottoms from the depropanizer through conduit 15, and combined with the isoparaffin from conduit 12 in conduit 26. The light gases and acid are withdrawn overhead from the depropanizer through conduit 16, combined with the stream from conduit 25 in conduit 17, charged to heat exchanger 18, withdrawn through conduit 19 and introduced to settler 20. In settler 20, a catalyst phase separates and is withdrawn through conduit 21. The remaining acid and light gases are charged from settler 20 through conduit 22 to HF stripper 23. Propane and other light gases are recovered in the bottom from HF stripper 23 by way of conduit 24. A mixture of light gases and acid is withdrawn overhead through conduit 25 and admixed with the overhead from depropanizer 14 in conduit 17. Make-up isoparaffin is introduced into conduit 26 by conduit 27, and the resulting isoparaffin stream is divided and charged into conduits 28 and 29. The stream of isoparaffin in conduit 29 is admixed with the olefin feed to the process in conduit 1. The stream of isoparaffin in conduit 28 is charged to secondary alkylation reactor 30, and contacted with an acid stream charged to reactor 30 through conduit 5. Effluent from reactor 30 flows through conduit 31 to settler 32, and settles to form a catalyst phase and a hydrocarbon phase. The hydrocarbon phase is withdrawn from the process through conduit 33. The catalyst phase is withdrawn from settler 32 through conduit 34, commingled with the acid stream from conduit 21 in conduit 35 and charged through conduit 35 to reactor 2. A slipstream of acid in conduit 35 is diverted to a regeneration procedure through conduit 36 and purified acid is returned to conduit 35 by way of conduit 37.

DETAILED DESCRIPTION

The $C_4$–$C_6$ branched-chain saturated hydrocarbons are suitable for use as the alkylatable reactant in this invention. Prefered for use are the isoparaffins isobutane, isopentane, and isohexane, particularly isobutane. The alkylatable reactant may suitably comprise a mixture of two or more branched chain hydrocarbons, or one or more of such suitable hydrocarbons diluted with $C_1$–$C_5$ saturated hydrocarbons, such as methane, ethane, etc., and/or diluted with such gases as nitrogen, hydrogen, etc.

The olefin-acting reactant utilized in an embodiment of the present invention may be a mono- or poly-olefinic $C_3$–$C_{20}$ hydrocarbon or a $C_3$–$C_{20}$ alkyl fluoride. Among the suitable olefins, mono-olefinic $C_3$–$C_4$ hydrocarbons are preferred, particularly 2-butene. From the suitable alkyl fluorides, $C_3$–$C_4$ alkyl monofluorides are preferred, e.g. butyl fluorides. These olefin-acting reactants may suitably be employed in the process of this invention as mixtures of two or more suitable reactants. They may also be suitably employed when diluted with gases such as $C_1$–$C_5$ saturated hydrocarbons, nitrogen, hydrogen, etc. A typical suitable olefin-acting reactant may be a petroleum refinery stream comprising a mixture of olefins, paraffins, nitrogen and hydrogen.

Hydrogen fluoride catalyst suitable for use in the process of the present invention comprises about 70% or more hydrogen fluoride, and preferably about 80% or more, by weight. The water content of the catalyst is less than about 5% and preferably less than about 2% by weight. The hydrocarbons in the catalyst acting as an organic diluent, have a molecular weight in the range from about 100 to about 500, and preferably from about 300 to about 400. The optimum concentration of particular components in the hydrogen fluoride catalyst depends on the particular embodiment of the invention. For example, in an embodiment where a particular alkylation reaction zone is utilized, the temperature in the alkylation zone might be held at a particularly high level, resulting in an increased optimum concentration of hydrocarbons in the catalyst phase over that conventionally utilized in prior art. All such modifications and aspects of optimization of the concentration of components of the catalyst are within the scope of the process of this invention, and will be obvious to those skilled in the art.

Methods and equipment suitable for reacting and separating the reaction mixture in hydrogen fluoride-catalyzed alkylation processes known to prior art, are also suitable for use in an embodiment of the process of this invention. The process may employ a batch reaction scheme, plug-flow reaction scheme or stirred-tank reaction scheme. Alkylation reaction zones which employ heat transfer means to withdraw heat liberated in the alkylation reaction are suitable, as are alkylation zones which depend on separate means to maintain the reaction temperature, e.g., by cooling the catalyst stream before introducing it to the alkylation zone. The alkylation conditions in the primary alkylation zone, wherein the olefin-acting reactant and the alkylatable reactant are contacted with the recycle catalyst stream, include a temperature of from about 0° F. to about 200° F. and a pressure of from about 1 atmosphere to about 30 atmospheres. It is preferred that the components of the reaction mixture be maintained in the liquid phase in the alkylation zone. In the alkylation of an isoparaffin such as isobutane with olefins such as butenes, the preferred temperature of alkylation conditions is within the range from about 25° to about 150° F. and the preferred pressure is within the range from about 5 atmospheres to about 20 atmospheres. The weight ratio of alkylatable reactant to olefin-acting reactant in the primary alkylation zone is in the range from about 5:1 to about 20:1, while the reactants-to-catalyst weight ratio is in the range from about 0.1:1 to about 10:1.

Separation zones suitable for utilization in the process of this invention are known to those skilled in the art. In general, conditions in the primary separation zone, wherein the effluent from the primary alkylation zone is separated to form a hydrocarbon phase and a catalyst phase, include a temperature and pressure essentially the same as those maintained in the primary alkylation zone. The separation conditions include a temperature and pressure at which the catalyst phase and the hydrocarbon phase remain liquid. The primary separation zone may be continuous with, or separate from, the primary alkylation zone.

Akylation conditions in the secondary alkylation zone, wherein the catalyst phase withdrawn from the primary settling zone is admixed with alkyltatable reactant, include a temperature and pressure in the range from about 0° F. to about 250° F. and a pressure in the range from about 1 atmosphere to about 50 atmospheres. Preferably, alkylation conditions in the secondary alkylation zone include a temperature in the range from about 50° F. to about 200° F. and a pressure in the range from about 10 atmospheres to about 20 atmospheres. The secondary alkylation zone may be of substantially the same type as the primary alkylation zone or different from it. The secondary alkylation zone may employ a batch, a plug-flow or a stirred-tank reaction scheme within the scope of the present process. The weight ratio of alkylatable reactant to catalyst in the reaction mixture is within the range from about 0.1:1 to about 10:1, and preferably from about 0.5:1 to about 2:1. The contact time for the reaction mixture in the secondary alkylation zone, defined as the ratio of catalyst volume within the reaction zone to volume rate per minute of alkylatable reactant will usually be less than about 15 minutes, and preferably less than about 5 minutes. When the catalyst phase from the primary separation zone is contacted with the alkylatable reactant at alkylation conditions in the secondary alkylation zone, the olefin-acting components of the organic diluent hydrocarbons in solution in the catalyst react with the alkylatable reactant to form hydrocarbon products which may be separated from the catalyst by allowing the effluent from the secondary alkylation zone to settle into a hydrocarbon phase and a catalyst phase in a manner essentially the same as employed to settle the effluent from the primary alkylation zone. The secondary settling zone, into which the effluent from the secondary alkylation zone is introduced, may be any suitable means for separating a hydrocarbon phase from a catalyst phase. Many such means are well known to prior art, and are suitable for an embodiment of the process of this invention. The secondary separation zone may be continuous with the secondary alkylation zone, or separate from it with suitable means, e.g., conduits, to transfer the alkylation zone effluent to it. Separation conditions in the secondary separation zone include a temperature and pressure essentially the same as those in the primary separation zone. The scope of the present invention includes embodiments where the primary alkylation zone and the secondary alkylation zone are of basically similar types, and embodiments where they are of different types and, similarly, includes embodiments where the primary and secondary separation zones are of basically similar or of basically different types.

Means for recovering alkylate product from a mixture of hydrocarbons, or hydrocarbons and catalyst, are well known in the art. Any method for separating the product may be utilized in an embodiment of the process of this invention. Typically, in prior art processes, the hydrocarbon phase is withdrawn from the primary separation zone and fractionated to separate and recover the alkylate product. Also produced in such a fractionation step is a hydrocarbon stream comprising primarily alkylatable reactant. This stream is generally recycled to the primary alkylation zone in previously disclosed processes. All, or a portion, of this stream may be introduced to the secondary alkylation zone as a suitable source of alkylatable reactant in the present process. Also suitable for use, as the alkylatable reactant introduced into the secondary separation zone, are the fresh, make-up alkylatable reactant and various other recycle streams of alkylatable reactant disclosed in prior art. These streams may be diluted with catalyst, alkylate product, etc.

The process herein disclosed provides a method for producing an alkylate product having superior anti-knock properties, and an effective method for providing a hydrogen fluoride catalyst possessing superior properties as an alkylation catalyst. Thus, the process of this invention overcomes problems inherent in prior art processes and is a technical advancement of the alkylation art.

I claim as my invention:

1. A process for purifying a hydrogen fluoride catalyst which was used in producing an alkylate product from an alkylatable reactant and an olefin-acting reactant which comprises the steps of:
   (a) contacting a first portion of said alkylatable reactant and said olefin-acting reactant with said catalyst in a first alkylation zone at alkylation conditions;
   (b) separating the effluent from said alkylation zone into a hydrocarbon phase and a catalyst phase in a first separation zone and recovering said product in said hydrocarbon phase;
   (c) contacting a mixture consisting essentially of said catalyst phase and a second portion of said alkylatable reactant in a second alkylation zone at alkylation conditions; and
   (d) separating the effluent from said second alkylation zone in a second separation zone to recover a purified catalyst phase and a second hydrocarbon stream.

2. The process of claim 1 further characterized in that said purified catalyst phase is introduced into said first alkylation zone.

3. The process of claim 1 further characterized in that said alkylatable reactant is an isoparaffinic hydrocarbon.

4. The process of claim 1 further characterized in that said alkylatable reactant is isobutane.

5. The process of claim 1 further characterized in that said olefin-acting reactant is a mono-olefinic hydrocarbon having from about 3 to about 20 carbon atoms per molecule.

6. The process of claim 1 further characterized in that said olefin-acting reactant is a butene.

7. The process of claim 1 further characterized in that said olefin-acting reactant is propene.

8. The process of claim 1 further characterized in that said olefin-acting reactant is an alkyl halide.

9. The process of claim 1 further characterized in that said first hydrocarbon phase is separated in a third separation zone at separation conditions to recover said alkylate product and a third hydrocarbon stream.

10. The process of claim 9 further characterized in that at least a portion of said third hydrocarbon stream is introduced into said first alkylation zone.

11. The process of claim 9 further characterized in that at least a portion of said third hydrocarbon stream is introduced into said second alkylation zone.

References Cited

UNITED STATES PATENTS

| | | | |
|---|---|---|---|
| 3,158,661 | 11/1964 | Plaster et al. | 260—683.48 |
| 3,080,438 | 3/1963 | Sailors | 260—683.48 |
| 2,990,437 | 6/1961 | Berger | 260—683.48 |
| 3,171,865 | 3/1965 | Davison et al. | 260—683.48 |

DELBERT E. GANTZ, Primary Examiner

G. J. CRASANAKIS, Assistant Examiner

U.S. Cl. X.R.

260—671